(12) United States Patent
Lee

(10) Patent No.: US 8,619,418 B2
(45) Date of Patent: Dec. 31, 2013

(54) MOUSE STRUCTURE

(75) Inventor: Tsung-Shih Lee, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 126 days.

(21) Appl. No.: 13/405,356

(22) Filed: Feb. 26, 2012

(65) Prior Publication Data

US 2013/0221817 A1   Aug. 29, 2013

(51) Int. Cl.
*G06K 1/16* (2006.01)

(52) U.S. Cl.
USPC ..................... 361/679.41; 345/163

(58) Field of Classification Search
USPC ...................................................... 361/679.4
See application file for complete search history.

(56) References Cited

U.S. PATENT DOCUMENTS

| | | | |
|---|---|---|---|
| 7,737,946 B2 * | 6/2010 | Yen ................................ | 345/163 |
| 8,072,423 B2 * | 12/2011 | Rolus Borgward ........... | 345/157 |
| 8,125,775 B2 * | 2/2012 | Lin et al. ...................... | 361/679.4 |
| 8,259,439 B2 * | 9/2012 | Lee et al. ................. | 361/679.02 |
| 2003/0214484 A1 * | 11/2003 | Haywood ...................... | 345/163 |
| 2008/0002340 A1 * | 1/2008 | Chatterjee et al. ............ | 361/679 |
| 2010/0214223 A1 * | 8/2010 | Jackson et al. ................ | 345/164 |
| 2010/0259878 A1 * | 10/2010 | Wang et al. ................ | 361/679.4 |
| 2011/0310015 A1 * | 12/2011 | Zucker et al. ................. | 345/163 |
| 2011/0310016 A1 * | 12/2011 | Zucker et al. ................. | 345/163 |
| 2012/0075186 A1 * | 3/2012 | Lee et al. ....................... | 345/163 |
| 2012/0106056 A1 * | 5/2012 | Lee et al. ....................... | 361/679.4 |
| 2012/0134089 A1 * | 5/2012 | Wu et al. .................... | 361/679.4 |
| 2013/0214657 A1 * | 8/2013 | Lee ............................. | 312/223.2 |
| 2013/0215030 A1 * | 8/2013 | Lee et al. ...................... | 345/163 |

\* cited by examiner

*Primary Examiner* — Lisa Lea Edmonds
(74) *Attorney, Agent, or Firm* — Cheng-Ju Chiang

(57) ABSTRACT

A mouse structure includes a housing and a sliding apparatus slidably engaged with the housing. The sliding apparatus includes a reacting portion having a cover and a bottom board, wherein the cover is provided with a first magnet group and at least two engaging portions, and the bottom board is provided with a second magnet group and at least two position portions. The first and second magnet groups are in polar opposition to and spaced from each other. When the sliding apparatus is in a closed state, the cover is propped against an upper wall of the housing by a repelling magnetic force, while the reacting portion moves out of the housing, the cover is being automatically pushed outwards by the repelling magnetic force and is retained by the engaging portions engaged with the position portions so as to position the cover in place.

5 Claims, 4 Drawing Sheets

MOUSE STRUCTURE

BACKGROUND OF THE INVENTION

1. Field of the Invention

The present invention relates to a mouse, and particularly to a mouse structure that is capable of being retractable, automatically positioned in an open state, and less space occupied when not in use.

2. Related Art

Types and shapes of mice are many and various. Whatever the type or shape is, a conventional mouse has its own physical size which occupies a certain space whenever it is in use or not. Although a mouse can be designed in small size, it is merely suitable for users having smaller palms but not for most users.

Hence a conventional mouse is being improved to have a retracting portion being retractable into a casing of the mouse to reduce the size when not in use. However, when the retracting portion is being moved out of the casing, an upper face of the retracting portion tends to retain an elevation difference with an upper wall of the housing, which causes an inappropriate position of the retracting portion, and is further required to be manually manipulated to align with the retracting portion and the casing. Otherwise the retracting portion will be retracted back to the casing while the mouse is in use, and which severely affects the use of the mouse. Furthermore, when being positioned in a close state, the retracting portion is manipulated with a certain force to move back to the casing, but the process of moving back is difficult and not smooth, causing the retracting portion to be blocked easily by the casing. Therefore, it is imperative to overcome the aforesaid drawbacks of the conventional mouse by improving it to be easy to use.

SUMMARY OF THE INVENTION

Accordingly, an object of the present invention is to provide a mouse structure having a retractable structure capable of being automatically positioned in place in an open state, and being reducible in size.

To achieve the above-mentioned object, a mouse structure of the present invention comprises comprising a housing having upper and lower walls, an internal space defined between the upper and lower walls, and an opening communicating with the internal space; a sliding apparatus slidably engaged with the housing and capable of sliding in and out of the housing from the opening, the sliding apparatus comprising a base portion and a reacting portion, the reacting portion having a cover and a bottom board, the cover having a position wall, an engaging face, and at least two engaging portions formed on two opposite sides of the cover, the bottom board having at least two position portions located with respect to the at least two engaging portions, and an accommodating portion facing the engaging face, and each of the engaging portions being movably engaged with respective position portion; a first magnet group disposed on the accommodating portion of the bottom board; and a second magnet group disposed on the engaging face of the cover with respect to the first magnet group, and the first and second magnet groups being in polar opposition to and spaced from each other.

With the above-mentioned structure, when being in a closed state, the sliding apparatus is located in the internal space of the housing, where the cover is propped against the upper wall of the housing by a repelling magnetic force exiting between the first and second magnet groups, while the reacting portion of the sliding apparatus moves out of the housing, the cover is being automatically pushed outwards by the repelling magnetic force and is retained by the engaging portions engaged with the position portions, whereby the position wall of the cover is propped against the upper wall of the housing, and the sliding apparatus is in an open state. Therefore, the sliding apparatus of the present invention is capable of being positioned in place in either the open or closed state

DESCRIPTION OF THE PREFERRED EMBODIMENTS

Figure 1:
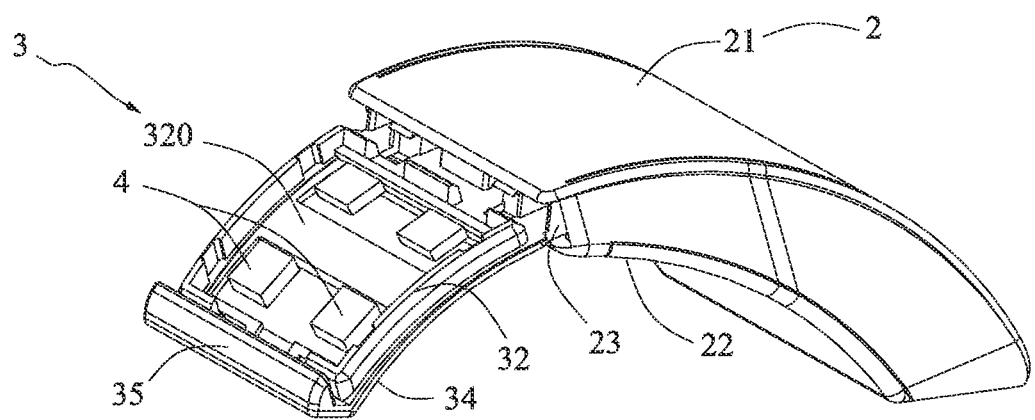
FIG. 1 is a partially assembly view of a mouse structure of the present invention in an open state, with a cover being removed.
Figure 2:
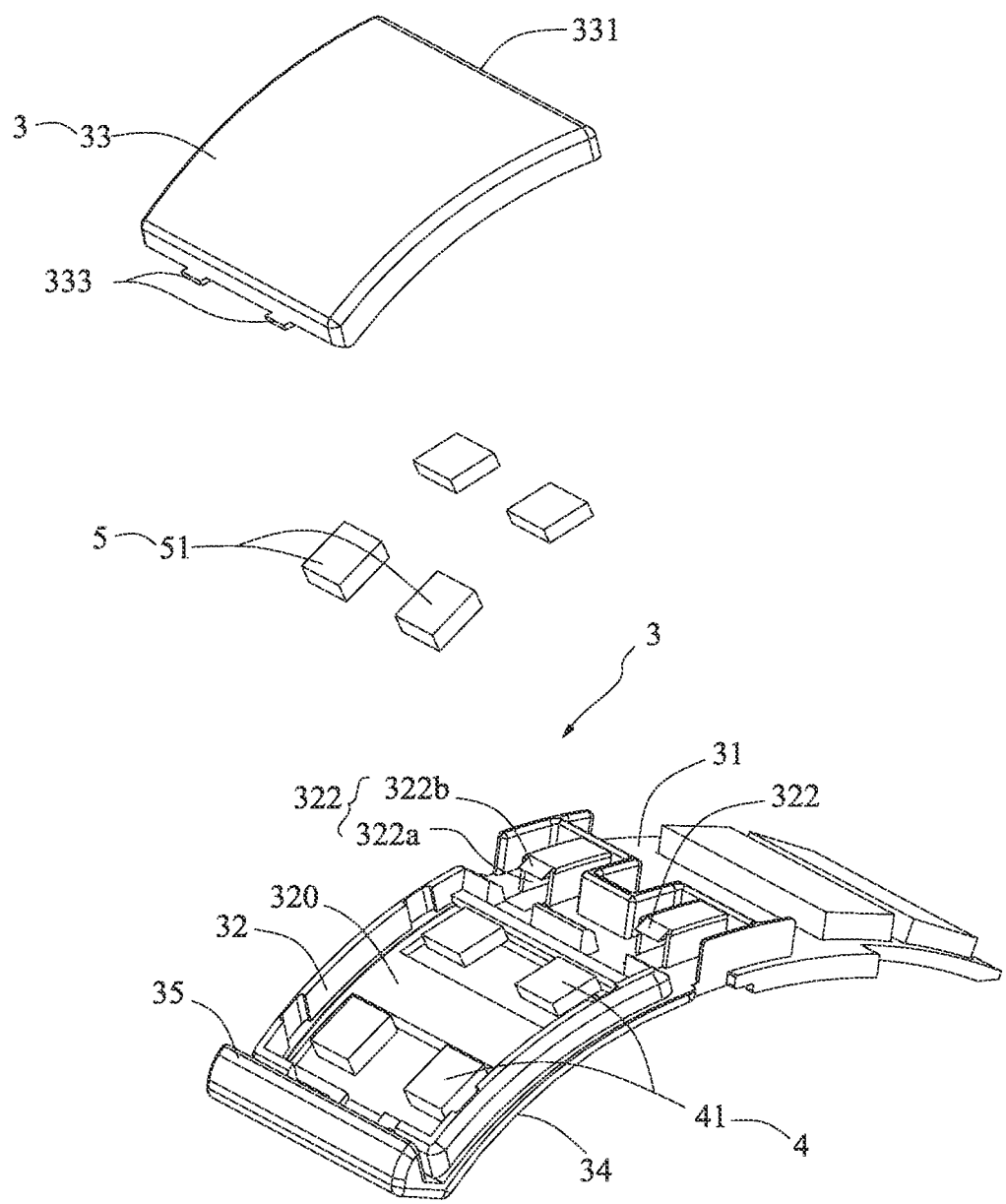
FIG. 2 is a schematic exploded view of a sliding apparatus of the mouse structure of the present invention.
Figure 3:
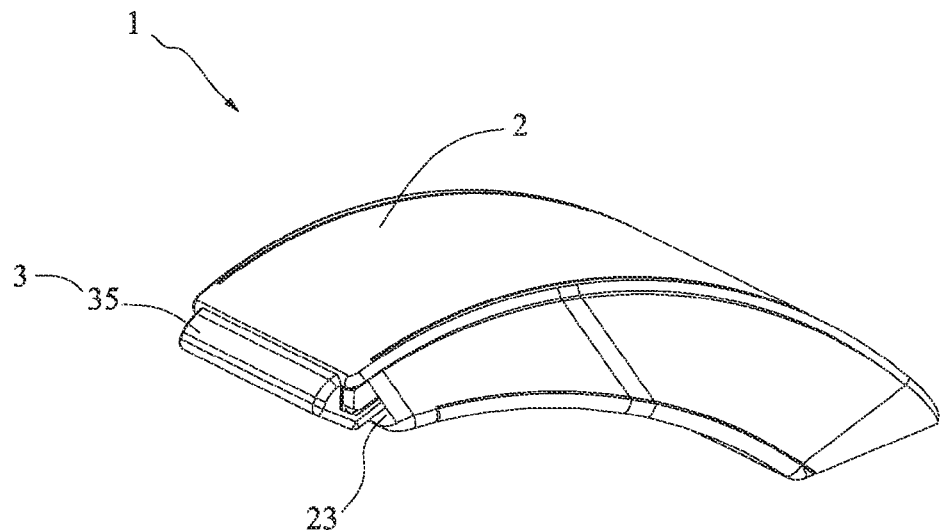
FIG. 3 is a schematic assembly view of the mouse structure in a closed state.
Figure 4:
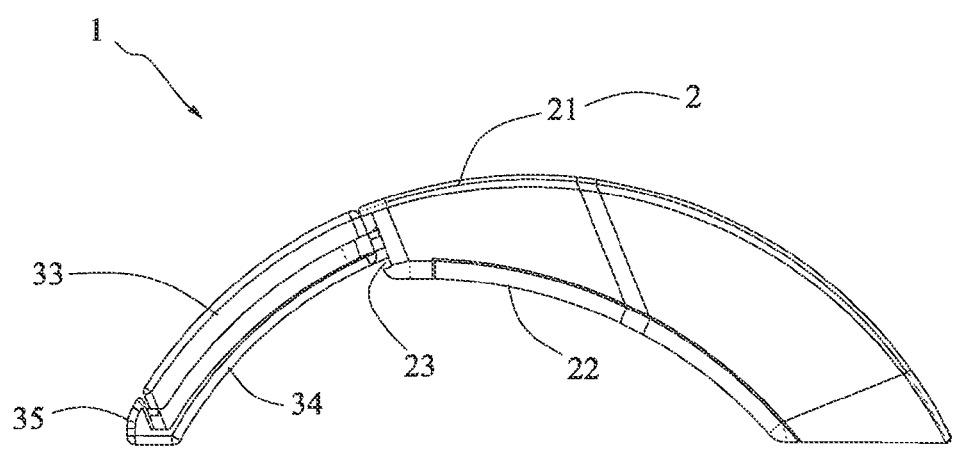
FIG. 4 is a right side elevation view of FIG. 3.

Referring to FIGS. 1, 2 and 3 showing a preferable embodiment of the present invention, a mouse structure 1 of present invention comprises a housing 2, a sliding apparatus 3, a first magnet group 4, and a second magnet group 5. The housing 2 has upper and lower walls 21, 22, an internal space 20 defined between the upper and lower walls 21, 22, and an opening 23 communicating with the internal space 20. In this preferred embodiment, the upper and lower walls 21, 22 of the housing 2 are curved in cross section (as shown in FIGS. 1 and 4). However, the shape of the housing 2 is not limited thereby.

Figure 5:
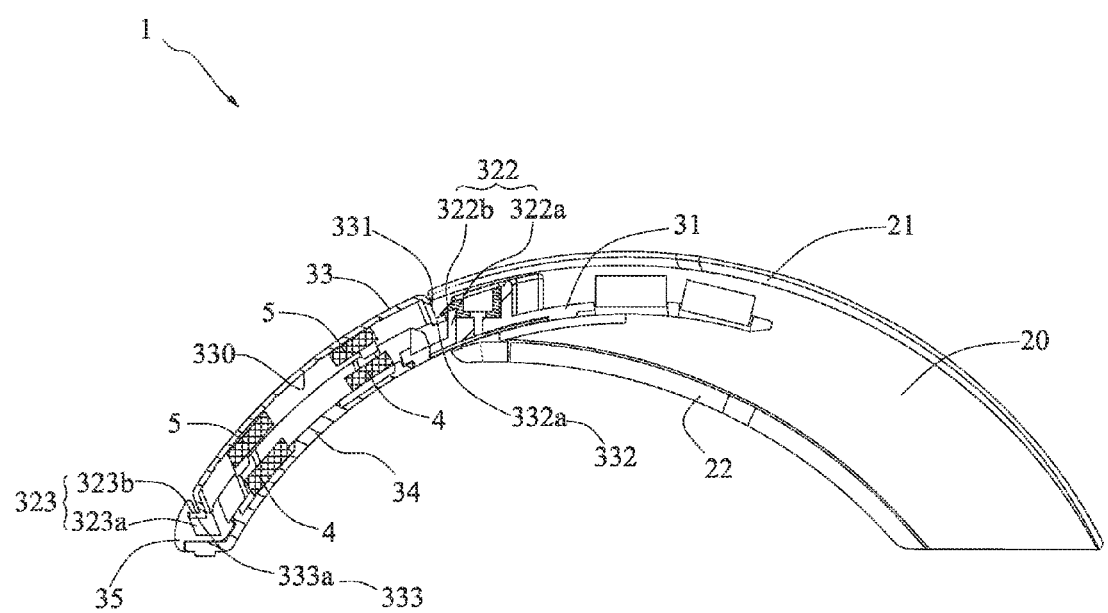
FIG. 5 is a schematic cutaway view of FIG. 4.

The sliding apparatus 3 is slidably engaged with the housing 2 and capable of sliding in and out of the internal space 20 of the housing 2 from the opening 23, and is being curved to correspond to the upper wall 21 of the housing 2 (as shown in FIGS. 4 and 5). The sliding apparatus 3 comprises a base portion 31 and a reacting portion 32, wherein the reacting portion 32 integrally extends from one end of the base portion 31, and has a cover 33 and a bottom board 34. The bottom board 34 has an accommodating portion 320 defined thereon and a holding portion 35 formed on one end of the bottom board 34, the holding portion 35 being exposed to the housing 2. The cover 33 is located above and engageable with the bottom board 34 (as shown in FIGS. 4 and 5), and has a position wall 331, an engaging face 330, and two pairs of engaging portions 332, 333. The pair of engaging portions 332 are integrally formed on a lower portion of the position wall 331, and another pair of engaging portions 333 are integrally formed on a side of the cover 33 with respect to the holding portion 35. Each of the two pairs of engaging portions 332, 333 has protruding ribs 332a, 333a protruding outwards, respectively (as shown in FIG. 5). The bottom board 34 is further provided with two pairs of position portions 322, 323 located with respect to the two pairs of the engaging portions 332, 333. As shown in FIGS. 2 and 5, each of the two pairs of the position portions 322, 323 has guiding slots 322a, 323a and limiting bars 322b, 323b formed above the guiding slots 322a, 323a. The pair of the position portions 323 are integrally formed on the holding portion 35, wherein the guiding slots 323a are recessed from the holding portion 35. The protruding ribs 332a, 333a are movable within the guiding slots 322a, 323a and limited by the limiting bars 322b, 323b.

Referring to FIGS. 2 and 5, the first and second magnet groups 4, 5 both have a plurality of magnets 41, 51. The magnets 41 of the first magnet group 4 are disposed at the accommodating portion 320 and arranged at corners of the bottom board 34 in order to provide a magnetic force evenly distributed on the bottom board 34. The magnets 51 of the second magnet group 5 are disposed on the engaging face 330 with respect to the magnets 41 of the first magnet group 4. In particular, the first and second magnet groups 4, 5 have like polarities facing each other; namely, the first and second magnet groups 4, 5 are in polar opposite to each other. Accordingly, a repelling magnetic force exits in between the first and second magnet groups 4, 5. The magnets 41, 51 can be fixed on the bottom board 34 and the cover 33, respectively, by adhesives or other regular fixing materials or structures (not shown).

Referring to FIGS. 4 and 5, when the sliding apparatus 3 is in a closed state, both the base portion 31 and the reacting portion 32 of the sliding apparatus 3 are located in the internal space 20 of the housing 2, with the holding portion 35 exposed to the opening 23, where the cover 33 is propped against the upper wall 21 of the housing 2 by the repelling magnetic force between the first and second magnet groups 4, 5. When the reacting portion 32 of the sliding apparatus 3 moves out of the housing 2 from the opening 23 by pulling the holding portion 35, the cover 33 is being automatically pushed outwards by the repelling magnetic force and is retained by the engaging portions 332, 333 engaged with the position portions 322, 323, whereby the position wall 331 of the cover 33 is propped against the upper wall 21 of the housing 2, upper surface of the cover 33 is in alignment with the upper wall 21 and retains no elevation difference with the upper wall 21 (as shown in FIGS. 4 and 5), and the sliding apparatus 3 is in an open state.

Likewise, when return the mouse structure 1 to the close state, it is only need to slightly press the cover 33 and push the holding portion 35 to move into the housing 2. No matter what part of the cover 33 is being pressed, the whole cover 33 moves in balance towards the bottom board 34 and keeps apart from the bottom board 34 due to the repelling magnetic force distributed evenly between the magnets 41, 51. Therefore, the sliding apparatus 3 smoothly moves into the internal space 20 of the housing 2. Particularly, the force exits between the cover 33 and the bottom board 34 is not limited by the magnetic force. Other structures that can produce an invisible force between the cover 33 and the bottom board 34 are applicable to the present invention.

Accordingly, the mouse structure 1 of the present invention utilizes the cooperation of the first and second magnet groups 4, 5 of the bottom board 34 and the cover 33 to automatically position the cover 33 with no elevation difference retained with the upper wall 21 of the housing 2 when the reacting portion 32 moves out of the housing 2 in the open state. Furthermore the sliding apparatus 3 is capable of moving back to the closed state smoothly and quickly. Hence, the mouse structure 1 of the present invention is not only retractable to reduce the physical size, but also easy and efficiently to be positioned in place in either the open or closed state.

It is understood that the invention may be embodied in other forms within the scope of the claims. Thus the present examples and embodiments are to be considered in all respects as illustrative, and not restrictive, of the invention defined by the claims.

What is claimed is:

1. A mouse structure, comprising:
a housing having upper and lower walls, an internal space defined between the upper and lower walls, and an opening communicating with the internal space;
a sliding apparatus slidably engaged with the housing and capable of sliding in and out of the housing from the opening, the sliding apparatus comprising a base portion and a reacting portion, the reacting portion having a cover and a bottom board, the cover having a position wall, an engaging face, and at least two engaging portions formed on two opposite sides of the cover, the bottom board having at least two position portions located with respect to the at least two engaging portions, and an accommodating portion facing the engaging face, and each of the engaging portions being movably engaged with respective position portion;
a first magnet group disposed on the accommodating portion of the bottom board; and
a second magnet group disposed on the engaging face of the cover with respect to the first magnet group, and the first and second magnet groups being in polar opposition to and spaced from each other;
wherein when being in a closed state, the sliding apparatus is located in the internal space of the housing, where the cover is propped against the upper wall of the housing by a repelling magnetic force exiting between the first and second magnet groups, while the reacting portion of the sliding apparatus moves out of the housing, the cover is being automatically pushed outwards by the repelling magnetic force and is retained by the engaging portions engaged with the position portions, whereby the position wall of the cover is propped against the upper wall of the housing, and the sliding apparatus is in an open state.

2. The mouse structure of claim 1, wherein the first and second magnet groups both have a plurality of magnets, the magnets of the first magnet group are arranged at corners of the bottom board, and the magnets of the second magnet group are disposed with respect to the magnets of the first magnet group.

3. The mouse structure of claim 1, wherein when the sliding apparatus is in the open state, an upper surface of the cover is in alignment with the upper wall of the housing and retains no elevation difference with the upper wall of the housing.

4. The mouse structure of claim 1, wherein each of the at least two engaging portions has a protruding rib protruding outwards, each of the at least two position portions has a guiding slot and a limiting bar formed above the guiding slot, and the protruding rib is movable within the guiding slot and is limited by with the limiting bar.

5. The mouse structure of claim 1, wherein a holding portion is formed on one end of the sliding apparatus and is exposed to the housing.

* * * * *